(12) United States Patent
Yabuta et al.

(10) Patent No.: US 7,758,071 B2
(45) Date of Patent: Jul. 20, 2010

(54) INFLATOR

(75) Inventors: Mikio Yabuta, Tatsuno (JP); Yasunori Iwai, Tatsuno (JP); Masayuki Ueda, Tokyo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 163 days.

(21) Appl. No.: 12/232,537

(22) Filed: Sep. 18, 2008

(65) Prior Publication Data

US 2009/0085335 A1 Apr. 2, 2009

Related U.S. Application Data

(60) Provisional application No. 60/976,975, filed on Oct. 2, 2007.

(30) Foreign Application Priority Data

Sep. 28, 2007 (JP) ............................... 2007-254001

(51) Int. Cl.
*B60R 21/268* (2006.01)
(52) U.S. Cl. ...................................... 280/737
(58) Field of Classification Search ................. 280/736, 280/737, 740, 741, 742
See application file for complete search history.

(56) References Cited

U.S. PATENT DOCUMENTS

| 5,893,583 | A | * | 4/1999 | Blumenthal et al. ......... 280/737 |
| 6,959,649 | B2 | | 11/2005 | Katsuda et al. |
| 7,222,880 | B2 | * | 5/2007 | Goto et al. .................. 280/740 |
| 2002/0109339 | A1 | | 8/2002 | Al-Amin |
| 2003/0111832 | A1 | * | 6/2003 | Kelley et al. ................. 280/736 |
| 2003/0168841 | A1 | * | 9/2003 | Goto et al. ................... 280/740 |
| 2006/0006632 | A1 | | 1/2006 | Tokuda et al. |

FOREIGN PATENT DOCUMENTS

JP 2003-104164 A 4/2003
JP 2005-343341 A 12/2005

* cited by examiner

*Primary Examiner*—Toan C To
*Assistant Examiner*—Joseph Rocca
(74) *Attorney, Agent, or Firm*—Birch, Stewart, Kolasch & Birch, LLP

(57) ABSTRACT

The invention relates to an inflator including:
a tubular inflator housing in which an opening portion at one end is closed, an opening portion at the other end is closed by a closure and the interior is charged with a gas, an igniter assembly, attached to the closure side, and a tubular gas discharge port,
the closure having an opening portion that serves as a gas passage in a part thereof, the opening portion being closed by a rupturable plate,
the igniter assembly formed by integrating a part of a metallic igniter collar and an electric igniter with a resin,
the igniter collar being fixed to the closure such that a space serving as a gas passage is formed between the igniter collar and the closure and an ignition portion of the electric igniter directly opposes the rupturable plate, and
the tubular gas discharge port including a plurality of gas discharge holes in a peripheral surface thereof, one end side of the tubular gas discharge port being welded and fixed to a part of the closure excluding the opening portion, a part of the peripheral surface of the tubular gas discharge port being supported by another part of the igniter collar, the other end side of the tubular gas discharge port projecting to the outside of the igniter collar.

10 Claims, 2 Drawing Sheets

INFLATOR

This nonprovisional application claims priority under 35 U.S.C. §119(a) on Patent Application No. 2007-254001 filed in Japan on 28 Sep. 2007, and 35 U.S.C. §119(e) on U.S. Provisional Application No. 60/976,975 filed on 2 Oct. 2007, which are incorporated by reference.

BACKGROUND OF INVENTION

1. Field of Invention

The present invention relates to an inflator for use in a restraining device for a vehicle, such as an air bag apparatus.

2. Description of Related Arts

The attachment location of a stored gas type inflator, which is used in an air bag apparatus for a side collision protection or a curtain air bag apparatus, within a vehicle is restricted, and therefore demand for a reduction in size of this type of inflator is particularly high.

In an inflator according to JP-A No. 2003-104164, as shown in FIG. 1 thereof, a dimension in width direction is increased because a gas discharge port 40 is attached, and hence there is room for improvement in relation to this point. In an inflator according to JP-A No. 2005-343341, as shown in FIG. 1 thereof, the dimension in width direction is reduced, but a gas discharge port 40 is welded directly to an igniter collar 27, and therefore the fixing strength of an igniter 36, which is fixed to the igniter collar 27 by resin, may be adversely affected by heat generated during the welding. In an inflator according to US-A No. 2002/0109339, as shown in FIG. 2 thereof, a part including an end cap 50, an initiator 70 and a retainer 90 is not subjected to any particular size reduction processing, and is simply smaller than a container 30 having a larger diameter.

SUMMARY OF INVENTION

The invention relates to an inflator including:

a tubular inflator housing in which an opening portion at one end is closed, an opening portion at the other end is closed by a closure and the interior is charged with a gas, an igniter assembly attached to the closure side, and a tubular gas discharge port, the closure having an opening portion that serves as a gas passage in a part thereof, the opening portion being closed by a rupturable plate, the igniter assembly formed by integrating a part of a metallic igniter collar and an electric igniter with a resin, the igniter collar being fixed to the closure such that a space serving as a gas passage is formed between the igniter collar and the closure and an ignition portion of the electric igniter directly opposes the rupturable plate, and the tubular gas discharge port including a plurality of gas discharge holes in a peripheral surface thereof, one end side of the tubular gas discharge port being welded and fixed to a part of the closure excluding the opening portion, a part of the peripheral surface of the tubular gas discharge port being supported by another part of the igniter collar, the other end side of the tubular gas discharge port projecting to the outside of the igniter collar.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
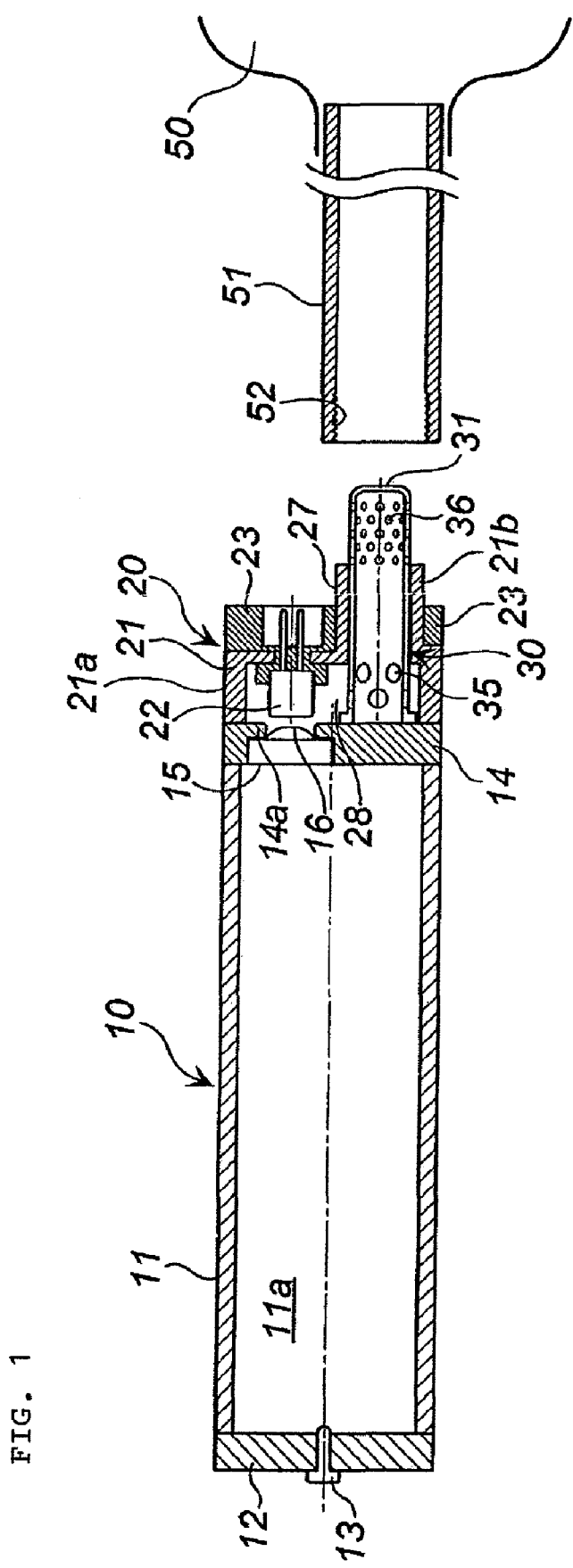
FIG. 1 shows an axial sectional view of an inflator according to the present invention, and a sectional view illustrating a method of connecting the inflator to an air bag.

The present invention provides an inflator that is suitable for use in a restraining device of a vehicle, and in which a dimension in width direction is particularly reduced.

A housing in which one end is closed and the other end side is open is used as the tubular inflator housing, and the opening portion at the other end is closed by a closure. When a housing in which both ends are open is used as the inflator housing, the opening portions at the both ends may be closed by respective closures.

The tubular inflator housing preferably has a uniform diameter (a uniform width) from one end to the other end, but a housing that does not have a uniform diameter, such as a housing having a bulging central part, may be used instead. The width direction cross-sectional shape of the tubular inflator housing is preferably circular, but is not limited thereto, and may be elliptical or polygonal.

A gas such as argon or helium is charged at high pressure into the tubular inflator housing, similarly to a conventional inflator.

The closure is welded and fixed to the opening portion of the inflator housing, and has the same shape as the opening portion such that when the opening portion is circular, the outer diameter of the closure is similar to that of the opening portion. An opening portion serving as a gas passage is formed in a part of the closure, and this opening portion is closed by a rupturable plate that is known and employed generally in an inflator.

The igniter collar included in the igniter assembly takes the form of a cup having an annular wall surface or a short tubular wall surface. One end surface side of the igniter collar is open, and two opening portions for attaching the electric igniter and the gas discharge port, respectively, are provided in the other end surface side, which corresponds to a bottom surface of the cup. The gas discharge port penetrates one of the two opening portions.

The igniter collar is attached such that the opening portion on one end surface thereof is fixed to the closure by a method such as welding and the ignition portion of the electric igniter directly opposes the rupturable plate. To ensure that the rupturable plate ruptures easily, the ignition portion of the electric igniter and the rupturable plate preferably oppose each other directly such that the respective central axes thereof match. However, as long as the rupturability of the rupturable plate is not impaired, the two central axes may deviate from each other.

The tubular gas discharge port is formed such that one end is open and the other end is closed, or such that both ends are closed, and a plurality of gas discharge holes are provided in the peripheral surface thereof or the peripheral surface and the bottom surface thereof. One end of the gas discharge port (the opening portion side when an opening portion is provided) is welded and fixed to the closure, and the other end side projects to the outside of the igniter collar. An intermediate part is partially supported by the igniter collar.

When incorporating the inflator into an air bag apparatus, the gas discharge port is connected to a gas introduction pipe for introducing gas into the air bag. Therefore, it is preferable that the gas discharge port does not move in an orthogonal direction to the axial direction. Hence, to ensure that the operation to connect the gas discharge port to the gas introduction pipe can be performed smoothly, the periphery of the intermediate part of the gas discharge port is preferably surrounded and supported by the igniter collar. In this case, the intermediate part and the igniter collar may either contact each other or not contact each other.

During an operation, the gas that is charged at high pressure in the inflator housing passes through the opening portion of the closure after the rupturable plate has been ruptured upon activation of the electric igniter, then passes through the space surrounded by the closure and the igniter collar, then passes through the gas discharge port, and is finally discharged through the gas discharge holes.

Thus, the rupturable plate, the electric igniter, and the gas discharge port are attached within the range of a single closure, and therefore the dimension in width direction can be held within the diameter range of the closure (in other words, within the diameter range of the inflator housing).

Further, the closure is welded and fixed to the inflator housing, and the gas discharge port is welded and fixed to the closure before the igniter collar is fixed to the closure. Hence, when the gas discharge port is welded to the closure, the resin that fixes the igniter to the igniter collar is unlikely to be affected by welding heat.

The invention preferably relates to the inflator, wherein, when the closure is bisected, an opening portion serving as a gas passage is formed in one part of the bisected closure, and one end of the gas discharge port is welded and fixed to the other part of the bisected closure.

When the closure is circular, the opening portion is formed on one semicircle side, and the gas discharge port is attached to the other semicircle side.

The invention preferably relates to the inflator, wherein the tubular gas discharge port is provided with an internal gas discharge hole formed in the space serving as a gas passage, and an external gas discharge hole formed in the part thereof that projects to the outside of the igniter collar.

To ensure that the gas flows smoothly through the gas discharge port, the gas discharge holes are preferably formed in a part of the gas discharge port that faces the space serving as the gas passage, which is surrounded by the closure and the igniter collar, and the part that projects to the outside of the igniter collar, but not in the intermediate part of the gas discharge port (in particular, the part in which the gas discharge port is surrounded by the igniter collar).

The invention preferably relates to the inflator, wherein a tubular projecting portion is formed on a part of the metallic collar, and a part of the peripheral surface of the tubular gas discharge port is supported by the tubular projecting portion.

By providing the tubular projecting portion on a part of the metallic collar and using the tubular projecting portion to support the gas discharge port, the gas discharge port can be supported easily, and the workability of the operation to connect the gas discharge port to the gas introduction pipe of the air bag improves.

The invention preferably relates to the inflator, wherein the tubular projecting portion of the metallic collar is connected to a gas introduction pipe that is connected to an air bag in order to introduce a gas into the air bag, and a gap exists between an inner wall surface of the tubular projecting portion and the peripheral surface of the tubular gas discharge port.

When connecting the tubular projecting portion of the metallic collar to the gas introduction pipe of the air bag, the following methods may be employed, for example: a method including forming a screw thread on an outer surface of the tubular projecting portion, forming, on an inner surface of the gas introduction pipe, a screw thread that can be screwed to the screw thread on the tubular projecting portion, and screwing the two screw threads together, or a method including inserting the tubular projecting portion into the gas introduction pipe and then crimping (pressing to form an annular groove in both tubular projecting portion and gas introduction pipe correspondingly to each other) from the outside.

When the tubular projecting portion of the metallic collar and the gas introduction pipe of the air bag have been connected in this manner, the tubular gas discharge port is positioned within the gas introduction pipe. Therefore, discharge of the gas is not affected even when a gap exists between the inner wall surface of the tubular projecting portion and the peripheral surface of the tubular gas discharge port, and the operation to insert the gas discharge port into the tubular projecting portion becomes easier because of such a gap.

The invention preferably relates to the inflator, wherein the opening portion, which is formed in the closure and serves as a gas passage, controls a gas flow rate in a gas passage extending from the opening portion of the closure to the external gas discharge hole.

When the gas flow rate (gas flow velocity) is controlled by the opening portion of the closure in this manner, the opening portion receives the maximum pressure, while the pressure applied to the gas passage further downstream decreases. Hence, the pressure capacity of the downstream side can be reduced in comparison with that of the inflator housing and the closure.

With the inflator of the present invention, the dimension in width direction in particular can be reduced while maintaining the inflator performance. Furthermore, constitutional components are not affected adversely by welding employed during assembly, and an assembly operation can be performed easily.

The present invention relates to an inflator suitable for use in a passenger protection device for a vehicle, such as an air bag apparatus.

Preferred Embodiment of Invention

Inflator

An inflator 10 of the present invention will be described using FIG. 1. FIG. 1 is an axial sectional view of the inflator 10 according to the present invention, and an axial sectional view of an air bag 50 and a gas introduction pipe 51 thereof.

A tubular inflator housing 11 has a uniform diameter from one end to the other end and a circular cross-section in a width direction, and is open at both ends. An opening portion at one end is closed by a disk-shaped first closure 12 welded and fixed thereto, and an opening portion at the other end is closed by a disk-shaped second closure 14 welded and fixed thereto.

A charging hole for charging gas into an internal space 11a of the inflator housing 11 is formed in the first closure 12, and the charging hole is closed by a metal pin 13, which is inserted into the charging hole after the gas has been charged and welded thereto so as to be integrated with the first closure 12.

An opening portion 15 is formed in one semicircular side of the second closure 14 when the second closure 14 is bisected, and the opening portion 15 is closed by a rupturable plate 16.

The rupturable plate 16 is welded and fixed to an annular projecting portion 14a of the second closure 14 forming the opening portion 15.

An igniter assembly 20 in which a metallic igniter collar 21 and an electric igniter 22 are integrated by a resin 23 is attached to the second closure 14.

The igniter collar 21 has an annular peripheral surface 21a. An opening portion in one end surface of the annular peripheral surface 21a is welded and fixed to the second closure 14, and the electric igniter 22 is fixed by the resin 23 to an opening portion positioned in the other end surface of the annular peripheral surface 21a, which directly opposes the rupturable plate 16. As shown in the drawing, a central axis of the rupturable plate 16 matches a central axis of an ignition portion of the electric igniter 22.

A gas discharge port 30 is attached to a front surface of a remaining portion of the second closure 14 in which the opening portion 15 is not formed (the other semicircular side of the bisected second closure 14).

The gas discharge port 30 is open at one end and forms a closed surface 31 at the other end. The opening portion of the gas discharge port 30 is welded and fixed to the second closure 14, and the gas discharge port 30 passes through a tubular projecting portion 21b formed on the igniter collar 21 such that the other end surface 31 thereof projects to the outside of the igniter collar 21.

The gas discharge port 30 has a plurality of internal gas discharge holes 35 in a part thereof that faces a space 28 surrounded by the second closure 14, the igniter collar 21, and the resin 23, and has a plurality of external gas discharge holes 36 in the part that projects to the outside of the igniter collar 21.

A peripheral surface of the gas discharge port 30 that is not formed with the internal gas discharge holes 35 and external gas discharge holes 36 is surrounded by the tubular projecting portion 21b, and a slight gap exists between the peripheral surface and an inner peripheral surface of the tubular projecting portion 21b surrounding the peripheral surface. There are no particular limitations on the length of the part of the gas discharge port 30 surrounded by the tubular projecting portion 21b, but this length may be set at approximately ⅓ to ½ of the overall length of the gas discharge port 30.

A screw thread 27 is formed on an outer peripheral surface of the tubular projecting portion 21b to connect the tubular projecting portion 21b to a gas introduction pipe 51 of an air bag 50. A screw thread 52 that can be screwed to the screw thread 27 is formed on an inner peripheral surface of the gas introduction pipe 51.

As shown in FIG. 1, an overall diameter of the inflator 10 is set within the range of a diametrical direction cross-sectional area of the inflator housing 11, and therefore the dimension in width direction is reduced.

Next, an operation of the inflator 10 when incorporated into an air bag apparatus for a vehicle will be described.

When the vehicle receives an impact, the igniter 22 is activated upon reception of a signal from an impact sensor (not shown), whereby an ignition charge is ignited and burned. The rupturable plate 16 is then ruptured by resulting combustion products. When the rupturable plate 16 ruptures, the opening portion 15 opens, and as a result, pressurized gas in the internal space 11a flows through the opening portion 15 into the space 28. The gas then flows into the gas discharge port 30 through the internal gas discharge holes 35, travels through the gas discharge port 30, and is discharged through the external gas discharge holes 36. The gas then flows into the air bag 50 through the gas introduction pipe 51 and causes the air bag 50 to expand.

During the gas discharge process, an opening area of the annular projecting portion 14a on the second closure 14 is set to be smaller than the sectional area of another gas passage (a gas passage in the space 28 that extends from the opening portion 15 to the internal gas discharge holes 35), the total opening area of the internal gas discharge holes 35, and the total opening area of the external gas discharge holes 36. Hence, a discharge velocity (discharge flow rate) of the gas is controlled in the annular projecting portion 14a, and the maximum pressure is applied to the annular projecting portion 14a and a smaller pressure is applied downstream.

<Method for Assembling Inflator and Method for Connecting Inflator to Air Bag>

Figure 2:
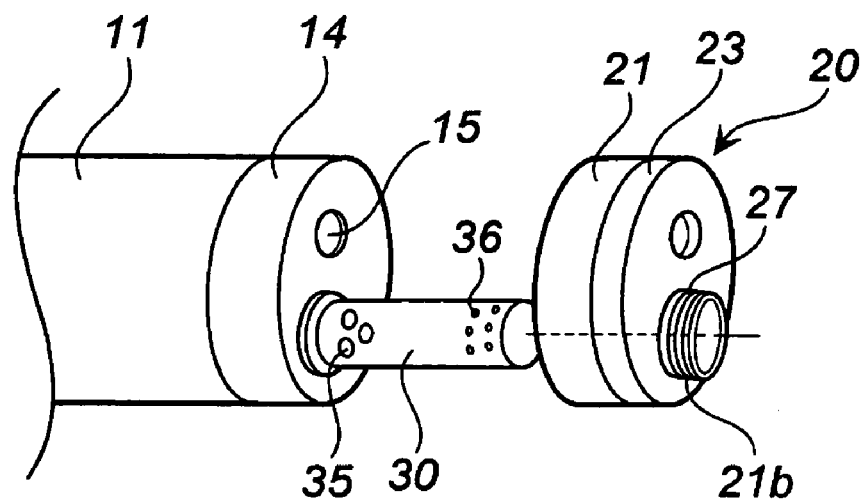
FIG. 2 shows a partial perspective view of FIG. 1.
Figure 3:
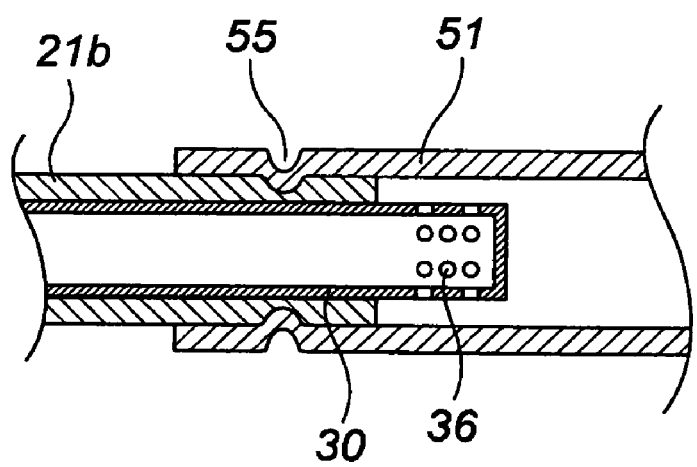
FIG. 3 shows a partial sectional view illustrating another method of connecting the inflator to the air bag.

Next, referring to FIGS. 1 to 3, an assembly method of the inflator 10 and a method for connecting the inflator 10 to the air bag 50 will be described. FIG. 2 is a partial perspective view of FIG. 1, and FIG. 3 is a view illustrating a method for connecting the inflator to the gas introduction pipe of the air bag.

First, the second closure 14, the opening portion 15 of which is closed by the rupturable plate 16, is welded and fixed to the inflator housing 11, one end side of which is closed by the first closure 12.

Then, the gas discharge port 30 is welded and fixed to the second closure 14.

Then, the gas discharge port 30 is inserted into the annular projecting portion 21b of the igniter assembly 20 (which is formed by attaching the igniter 22 to the igniter collar 21 by the resin 23). At this time, the inner diameter of the tubular projecting portion 21b is slightly larger than the outer diameter of the gas discharge port 30, and therefore the attachment operation is easy.

Next, a contact portion between the second closure 14 and the igniter collar 21 is welded and fixed. At this time, the welding portion is apart from the resin 23, and therefore the resin 23 is not deformed by welding heat.

Next, gas is charged from the first closure 12 side, and the charging hole is closed by the pin 13.

Next, the tubular projecting portion 21b is inserted into the gas introduction pipe 51 of the air bag 50 and fixed thereto by screwing together the screw thread 27 and the screw thread 52. At this time, the gas discharge port 30 is supported by the tubular projecting portion 21b. Therefore it is unlikely that the gas discharge port 30 moves to obstruct the operation when the tubular projecting portion 21b is inserted into the gas introduction pipe 51. Further, the gas discharge port 30 is located within the gas introduction pipe 51, and therefore, even if a gap exists between the tubular projecting portion 21b and the gas discharge port 30, gas leakage and gas flow blockage do not occur.

Note that when the tubular projecting portion 21b is inserted into and fixed to the gas introduction pipe 51 of the air bag 50, a fixing method such as that shown in FIG. 3 may be applied instead of a screwing method. In the method shown in FIG. 3, the tubular projecting portion 21b is inserted into the gas introduction pipe 51, whereupon an overlapping part is pressed from the outside to form a continuous or discontinuous annular groove 55 straddling both the gas introduction pipe 51 and the tubular projecting portion 21b, thereby fixing the two together.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An inflator comprising:

a tubular inflator housing in which an opening portion at one end is closed, an opening portion at the other end is closed by a closure and the interior is charged with a gas, an igniter assembly, attached to the closure side, and a tubular gas discharge port, the closure having an opening portion that serves as a gas passage in a part thereof, the opening portion being closed by a rupturable plate, the igniter assembly formed by integrating a part of a metallic igniter collar and an electric igniter with a resin, the igniter collar being fixed to the closure such that a space serving as a gas passage is formed between the igniter collar and the closure and an ignition portion of the electric igniter directly opposes the rupturable plate, and the tubular gas discharge port including a plurality of gas discharge holes in a peripheral surface thereof, one end side of the tubular gas discharge port being welded and fixed to a part of the closure excluding the opening portion, a part of the peripheral surface of the tubular gas discharge port being supported by another part of the igniter collar, the other end side of the tubular gas discharge port projecting to the outside of the igniter collar.

2. The inflator according to claim 1, wherein, when the closure is bisected, an opening portion serving as a gas passage is formed in one part of the bisected closure, and one end of the gas discharge port is welded and fixed to the other part of the bisected closure.

3. The inflator according to claim 2, wherein the tubular gas discharge port is provided with an internal gas discharge hole formed in the space serving as a gas passage, and an external gas discharge hole formed in the part thereof that projects to the outside of the igniter collar.

4. The inflator according to claim 2, wherein a tubular projecting portion is formed on a part of the metallic collar, and a part of the peripheral surface of the tubular gas discharge port is supported by the tubular projecting portion.

5. The inflator according to claim 2, wherein the tubular projecting portion of the metallic collar is connected to a gas introduction pipe that is connected to an air bag in order to introduce a gas into the air bag, and a gap exists between an inner wall surface of the tubular projecting portion and the peripheral surface of the tubular gas discharge port.

6. The inflator according to claim 2, wherein the opening portion, which is formed in the closure and serves as a gas passage, controls a gas flow rate in a gas passage extending from the opening portion of the closure to the external gas discharge hole.

7. The inflator according to claim 1, wherein the tubular gas discharge port is provided with an internal gas discharge hole formed in the space serving as a gas passage, and an external gas discharge hole formed in the part thereof that projects to the outside of the igniter collar.

8. The inflator according to claim 1, wherein a tubular projecting portion is formed on a part of the metallic collar, and a part of the peripheral surface of the tubular gas discharge port is supported by the tubular projecting portion.

9. The inflator according to claim 1, wherein the tubular projecting portion of the metallic collar is connected to a gas introduction pipe that is connected to an air bag in order to introduce a gas into the air bag, and a gap exists between an inner wall surface of the tubular projecting portion and the peripheral surface of the tubular gas discharge port.

10. The inflator according to claim 1, wherein the opening portion, which is formed in the closure and serves as a gas passage, controls a gas flow rate in a gas passage extending from the opening portion of the closure to the external gas discharge hole.

* * * * *